F. V. WHITMAN.
BICYCLE GEAR.
APPLICATION FILED JULY 13, 1909.
981,729.
Patented Jan. 17, 1911.
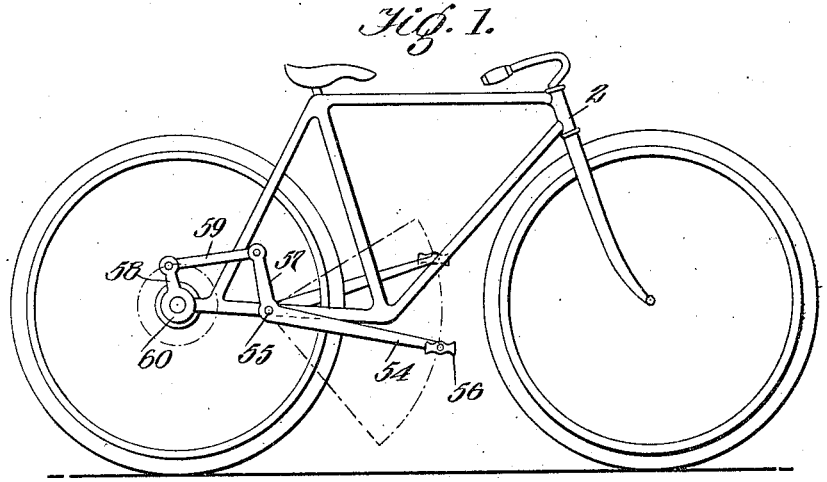
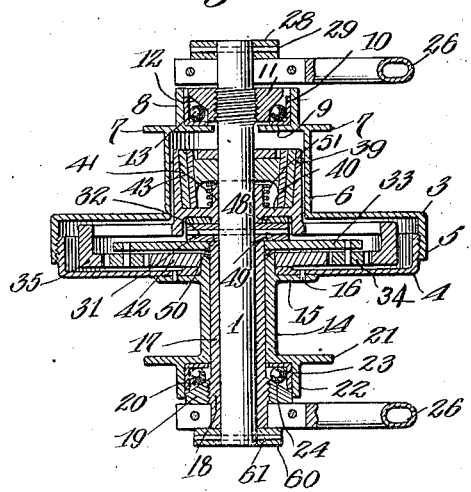
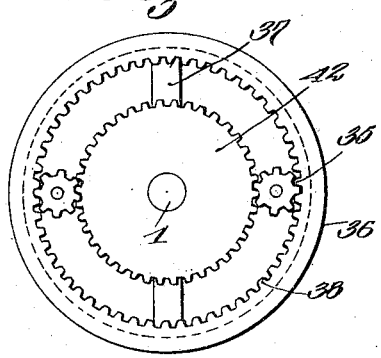
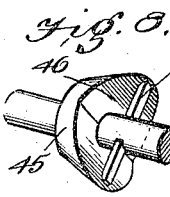
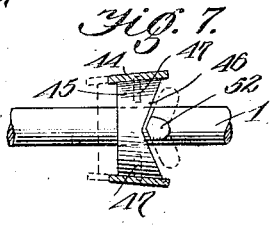
WITNESSES
Samuel E. Wade
C. E. Travis
INVENTOR
FRANK V. WHITMAN
BY Munn & Co.
ATTORNEYS

UNITED STATES PATENT OFFICE.

FRANK VEEDER WHITMAN, OF WALKERVILLE, MONTANA.

BICYCLE-GEAR.

981,729.

Specification of Letters Patent. Patented Jan. 17, 1911.

Application filed July 13, 1909. Serial No. 507,328.

*To all whom it may concern:*

Be it known that I, FRANK VEEDER WHITMAN, a citizen of the United States, and a resident of Walkerville, in the county of Silverbow and State of Montana, have invented certain new and useful Improvements in Bicycle-Gears, of which the following is a specification.

My invention is on improvements in bicycle gears, and consists in certain novel constructions and combinations of parts, hereinafter described and claimed.

The object of the invention is to provide a driving mechanism, wherein the rotating crank shaft is replaced by oscillating elbow levers, and wherein a simple form of gearing connects the elbow levers with the driving wheel.

Referring to the drawings forming a part hereof, Figure 1 is a side view of a bicycle provided with the improvement, Fig. 2 is a transverse section of the gearing, Fig. 3 is a front view of a portion of the gearing, Fig. 4 is a detail view of one of the rear axle bearings, Fig. 5 is a side view of the pinion carrying arm, Fig. 6 is a detail view of a portion of the mechanism, Fig. 7 is a detail section view of the shaft and ring, and Fig. 8 is a perspective view of the axle and the block for operating the friction ring.

The embodiments of the invention shown in the drawings consists of a gear casing to be presently described in detail in which the rear axle 1 of the bicycle 2 is supported, the said casing being arranged inside of the wheel proper as shown in Fig. 2. The casing consists of two sections each comprising a disk 3, 4, each of which is provided with a lateral annular flange 5, the flange of the disk 4 being externally threaded, while the flange of the disk 3 is internally threaded, and screwed into the flange of the disk 4. The disk 3 is provided with a hub portion 6 having a radial annular flange 7 and a reduced portion 8 beyond the flange, and with an internal radial annular flange 9, between which and the inner surface of the reduced portion 8 is arranged a ball ring 10. The axle 1 is threaded over a portion of its length at the end adjacent to the ball ring, and a collar 11 is threaded onto the axle, the said collar having a beveled portion 12, coöperating with the ring 10 to form a ballrace, in which is received a series of balls 13. The disk 4 is also provided with a hub portion 14 in the form of a sleeve, and having a radial flange 15 to which the disk is connected by nuts 16. A bearing sleeve 17 in which is the axle 1, is journaled in the sleeve, and the said sleeve near its outer end is provided with a threaded portion 18 on which is threaded a collar 19 having an outer beveled face 20. The hub portion or sleeve 14 is also provided near its outer end with a radial flange 21 having near its margin an outwardly extending marginal rim 22, over-lying the collar, and a ball ring 23 is arranged between the rim and the flange, and coöperates with the beveled face 20 of the collar to form a ball race in which is received a series of balls 24. A split bearing encircles the axle at one end thereof, and the sleeve 17 at the other end, one section 25 of each of the bearings being integral with the adjacent rear fork 26 of the bicycle, while the other 30 is clamped thereto by means of cap screws 27.

The spokes (not shown) of the rear wheel are secured to the flanges 7 and 21 respectively of the disks 3 and 4, one half to each disk, and the disks and flanges 5 together with the hub portions form a dust cover for the gearing which is contained therein. A washer 31 is pinned to the shaft within the disks by means of a pin 32, and an arm 33 is keyed to the sleeve 17 adjacent to the washer, the end of the sleeve abutting against the washer. A pinion 34 is journaled on each end of the arm 33, and the said pinions mesh with a series of internal gear teeth 38 on the over-lying flange 35 of a ring 36, which is supported by radial arms 37 extending from a cone bearing sleeve 39 provided with a diaphragm 40 having a hub 41 for receiving the axle. The pinions also mesh with a gear wheel 42 keyed to the sleeve 14, and consequently rigid with the driving wheel. A cone shaped sleeve 43 of wood is arranged with the bearing sleeve 39, and a cone shaped ring 44 fits within the sleeve. A disk 45 is pinned to the ring by pins 47, and is provided with an opening for receiving the axle. The disk 45 is also provided in its outer face with a depression 46, formed by two planes meeting at an angle and whose apex is the center of the axle. A wooden thrust washer 48 encircles the hub portion 41 of the diaphragm 40, and a washer 31 is pinned to the axle 1 by a pin 32, the washer holding the bearing sleeve 39, and the internal gear ring from endwise movement, and a spiral spring 51 encircles the hub 41 on the opposite side from the washer, the ends of the spring engaging the diaphragm and the disk 45 respectively.

The axle 1 has integral radial arms 52 adjacent to the cone face of the disk 45, which when the axle is rotated forwardly engage the plane faces 46 of the disk 45, and move the said disk endwise toward the diaphragm 40. This movement clamps the bearing sleeve 39 to the ring 44, and since the bearing sleeve is rigid with the internal gear ring, the ring moves with the axle.

The forward rotation of the gear ring rotates the pinions 35, and the said pinions are prevented from bodily movement by the keying of the sleeve 17 to the adjacent split bearing of the fork 26 by a key 53. Hence the forward movement of the gear ring is transmitted to the gear wheel 42, moving the said wheel forward but at a much greater speed than the gear ring. The said gear ring is rigid with the driving wheel and thus a forward movement is imparted to the bicycle. When the forward rotation of the axle ceases, the driving wheel is freed from the said axle, the sleeve 39 and ring 44 being moved out of engagement by the spring 51. When the axle is rotated in a reverse direction the action is the reverse of that described for the forward movement.

The axle is rotated by means of a pair of elbow levers, one of which is pivoted to each side of the frame, as at 55. A pedal 56 is connected with one of the arms 54 of each of the levers, and the other arm 57 is connected by a link 59 with a radial arm 58 on a washer 60 pinned to the end of the axle as at 61. The elbow levers are arranged with the corresponding arms at angles with respect to each other, so that when one arm 54 is depressed the corresponding arm of the other lever will be elevated, the levers moving in opposite directions. When the elbow levers are moved up and down, the axle is intermittently rotated, and the ring 44 is moved longitudinally thereof, to engage the ring and the bearing sleeve, and the gearing will be operated as previously described.

It will be evident from the description that when the pedals are held at the halfway point, that is in an operative position, the shaft will be released, so that the wheel may coast. When the pedals are at the halfway point, a braking effect will take place, by a slight depressing of the left pedal and a slight elevating of the right pedal, as from the description. This is due to the movement of the disk 45 by the pins 52, farther into the ring 44, thus clamping the disk to the ring, and the ring to the bearing sleeve 39, which is integral with the internal gear ring.

The rotary movement of the axle 1 is continuous, the arms 58 acting as cranks and the shaft is rotated through the connection of the links 59 with the said cranks. As long as the axle is rotated in a forward direction, and the speed of the bicycle is not in excess of the speed of the axle, the pin 52 will retain the block disk 45 in engagement with the friction ring. As soon as the speed of the bicycle exceeds the speed of the axle the pin 52 is overtaken by the disk, and the driving mechanism is released from the axle, the bicycle now coasting. When the pedals are worked backward a braking action results as will be evident. The arms 58 are prevented from lateral movement outwardly by means of washers 28, which are held in position by pins 29.

I claim:

1. In a bicycle, a rear axle, a wheel provided with a two part hub encircling the axle, a cone shaped ring on the axle at one end thereof, means whereby the oscillation of the axle will shift the ring, a cone-shaped bearing sleeve for engagement by the ring when it is shifted to lock the sleeve to the axle, a spring acting normally to move the ring and sleeve apart, an internally toothed gear ring supported by the bearing sleeve, a gear wheel secured to the hub within the same, a fixed bar having at its center a bearing for receiving the axle, pinions on the ends thereof, and meshing with the teeth of the ring and the gear wheel, elbow levers pivoted to each side of the bicycle frame, a pedal on one arm of each lever, a ring encircling each end of the axle and secured thereto, and provided with a radial arm, and a link connecting the arm with the other arm of the adjacent elbow lever.

2. In a bicycle, a rear axle, a wheel provided with a two part hub encircling the axle, a cone-shaped ring on the axle at one end thereof, means whereby the rotation of the axle will shift the ring, a cone-shaped bearing sleeve for engagement by the ring when it is shifted to lock the sleeve to the axle, a spring acting normally to move the ring and sleeve apart, an internally toothed gear ring supported by the bearing sleeve, a gear wheel secured to the hub within the same, a fixed bar having at its center a bearing for receiving the axle, pinions on the ends thereof and meshing with the teeth of the ring and the gear wheel, and means for rotating the axle.

3. In a bicycle, a rear axle, means for rotating the same, a wheel having a hub encircling the axle, a gear wheel rigid with the hub, a fixed bar having a central opening for the axle, a pinion on each end thereof and meshing with the gear wheel, an internal gear meshing with the pinions, a cone-shaped bearing sleeve encircling the axle and supporting the ring, a conical ring movable longitudinally of the axle for engaging the sleeve to lock it to the axle, a spring for separating the ring and the sleeve, and means whereby when the axle is rotated in either direction the ring will be moved.

4. In a bicycle, a rear axle, means for rotating the same, a wheel having a hub encircling the axle, a gear wheel rigid with the hub, a fixed bar having a central opening for the axle, a pinion on each end thereof and meshing with the gear wheel, an internal gear meshing with the pinions, a normally inactive friction clutch for connecting the ring to the axle, and means whereby the rotation of the axle in either direction will operate the clutch.

5. In a bicycle, a rear axle, means for rotating the same, a wheel having a hub encircling the axle, a gear wheel rigid with the hub, a fixed bar having a central opening for the axle, a pinion on each end thereof, and meshing with the gear wheel, an internal gear meshing with the pinions, and means operated by the rotation of the axle to connect the internal gear therewith.

FRANK VEEDER WHITMAN.

Witnesses:
  EDWARD H. GOLDEN,
  JOHN F. FRENCH.